US008362355B2

(12) United States Patent
Pettersson

(10) Patent No.: US 8,362,355 B2
(45) Date of Patent: Jan. 29, 2013

(54) SEALED MONOLITHIC PHOTO-ELECTROCHEMICAL SYSTEM AND A METHOD FOR MANUFACTURING A SEALED MONOLITHIC PHOTO ELECTROCHEMICAL SYSTEM

(75) Inventor: Henrik Pettersson, Mölndal (SE)

(73) Assignee: Dyenamo AB, Kista (SE)

( * ) Notice: Subject to any disclaimer, the term of this patent is extended or adjusted under 35 U.S.C. 154(b) by 904 days.

(21) Appl. No.: 12/225,440

(22) PCT Filed: Mar. 27, 2007

(86) PCT No.: PCT/EP2007/052927
§ 371 (c)(1),
(2), (4) Date: Mar. 30, 2009

(87) PCT Pub. No.: WO2007/110427
PCT Pub. Date: Oct. 4, 2007

(65) Prior Publication Data
US 2010/0229922 A1    Sep. 16, 2010

(30) Foreign Application Priority Data

Mar. 27, 2006  (EP) .................................... 06006274

(51) Int. Cl.
*H01L 31/00* (2006.01)
(52) U.S. Cl. ........................................................ 136/256
(58) Field of Classification Search .................. 136/263, 136/256
See application file for complete search history.

(56) References Cited

U.S. PATENT DOCUMENTS

| 4,888,062 | A | * | 12/1989 | Nakagawa et al. | ........... | 136/258 |
| 6,069,313 | A | * | 5/2000 | Kay | ................................ | 136/249 |
| 6,222,117 | B1 | * | 4/2001 | Shiozaki | ........................ | 136/256 |
| 2004/0099303 | A1 | | 5/2004 | Pettersson et al. | | |
| 2005/0236037 | A1 | * | 10/2005 | Ahn et al. | ...................... | 136/263 |

FOREIGN PATENT DOCUMENTS

JP        3-129728        6/1991
(Continued)

OTHER PUBLICATIONS

"International Application Serial No. PCT/EP2007/052927, International Search Report mailed Jul. 31, 2007", 3 pgs.
Kay, A., et al., "Low cost photovoltaic modules based on dye sensitized nanocrystalline titanium dioxide and carbon powder", *Solar Energy Materials and Solar Cells*, 44, (1996), 99-117.

(Continued)

*Primary Examiner* — Jennifer Michener
*Assistant Examiner* — Eli Mekhlin
(74) *Attorney, Agent, or Firm* — Harness, Dickey & Pierce, P.L.C.

(57) ABSTRACT

A sealed monolithic photo-electrochemical system including an electrically insulating substrate, an electrically conducting pattern having carrier areas arranged to support working electrodes, contact portions connected to counter electrodes, a first set of contact paths connecting the carrier areas with a first terminal, and a second set of contact paths connecting the contact portions with a second terminal. The system further includes an array of porous structures arranged on the substrate, where each porous structure includes a working electrode, an insulating layer and a counter electrode, an electrolyte at least partially filled in the porous structures for forming a plurality of electrochemical cells and an encapsulation covering the array of porous structures, and a method for manufacturing a sealed monolithic electrochemical system.

26 Claims, 10 Drawing Sheets

FOREIGN PATENT DOCUMENTS

| | | |
|---|---|---|
| WO | WO 97/16838 | 5/1997 |
| WO | WO-97/16838 A1 | 5/1997 |
| WO | WO 01/97237 | 12/2001 |
| WO | WO-01/97237 A1 | 12/2001 |

OTHER PUBLICATIONS

Japanese Office Action dated Nov. 6, 2012, issued in Japanese Patent Application No. P2009-502071.

* cited by examiner

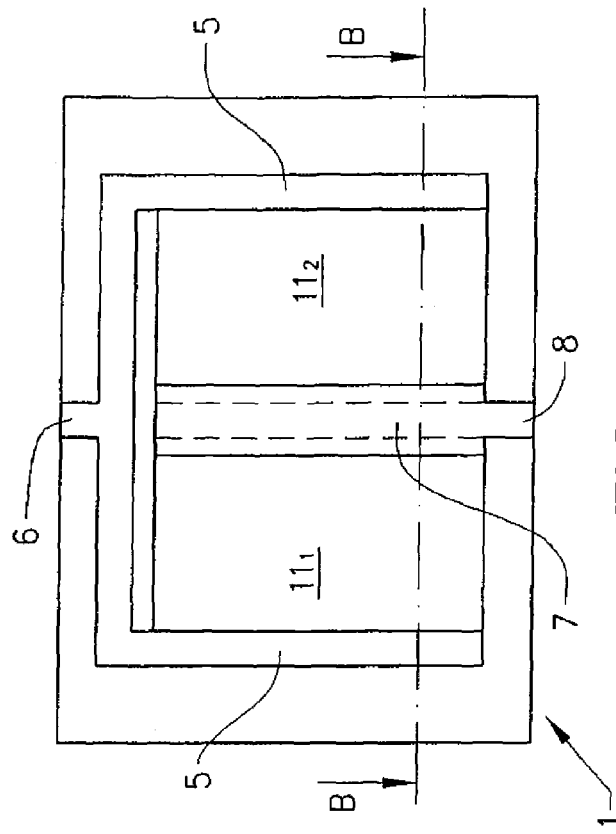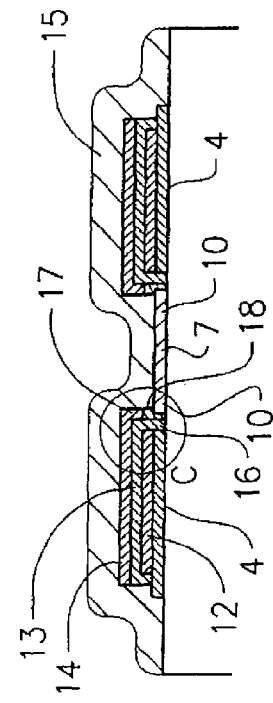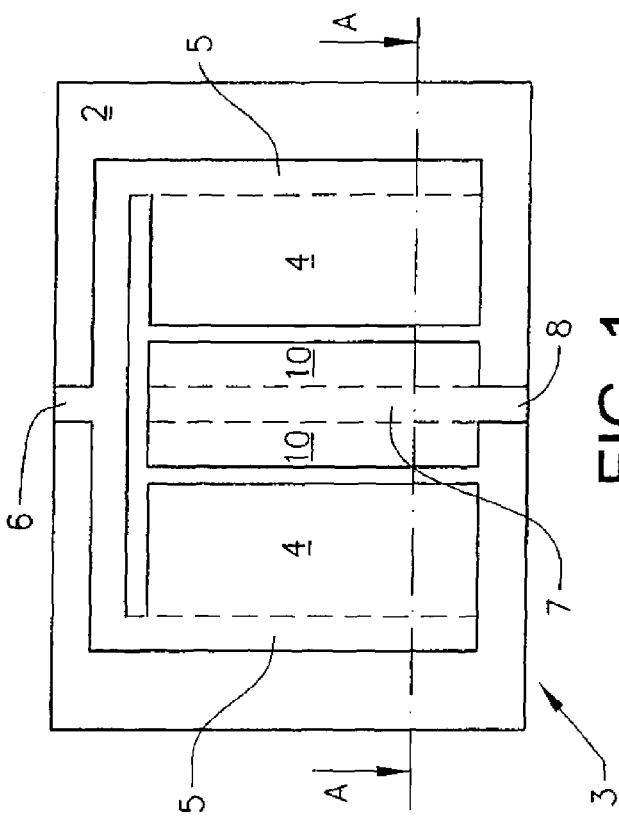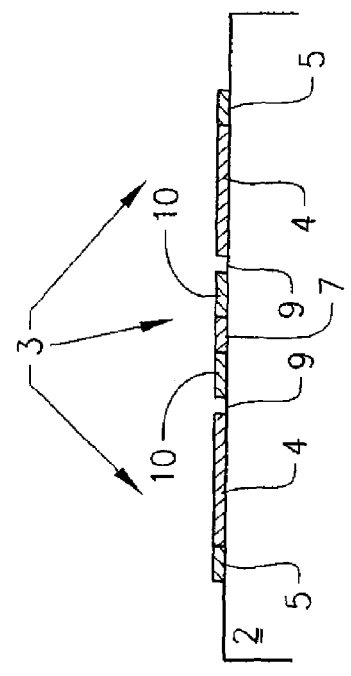

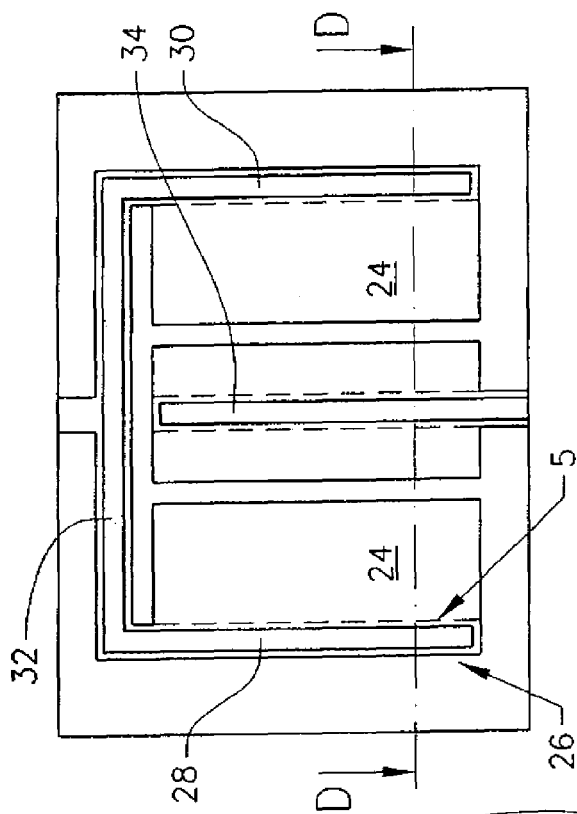
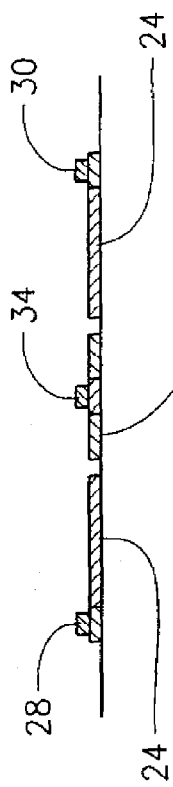
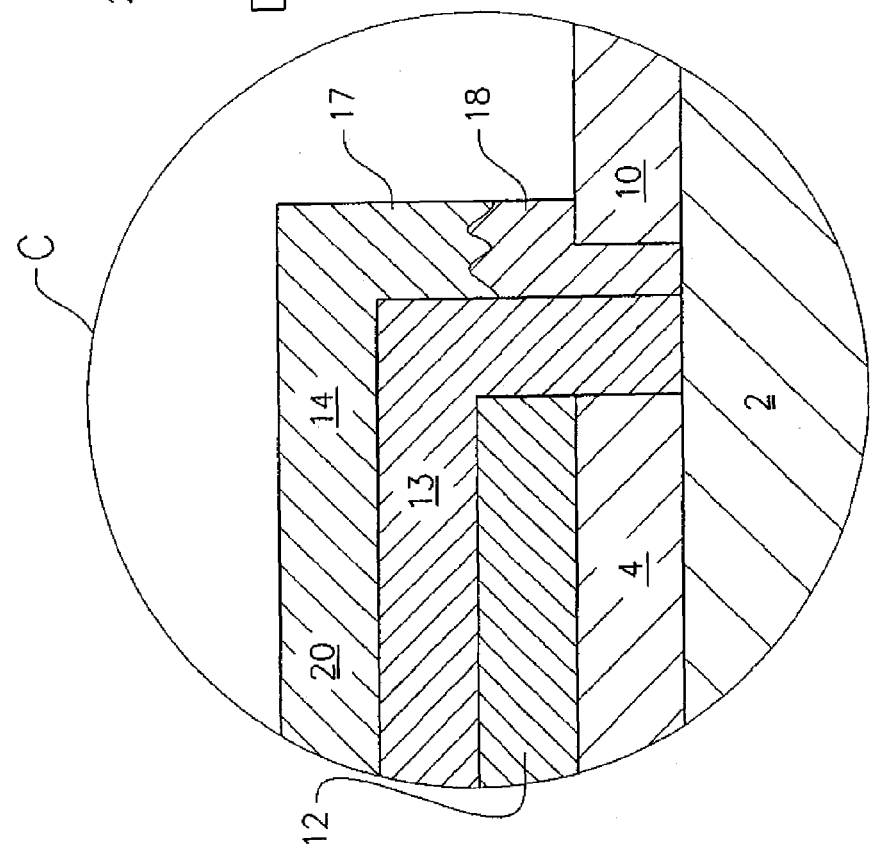
FIG. 5
FIG. 6
FIG. 4a

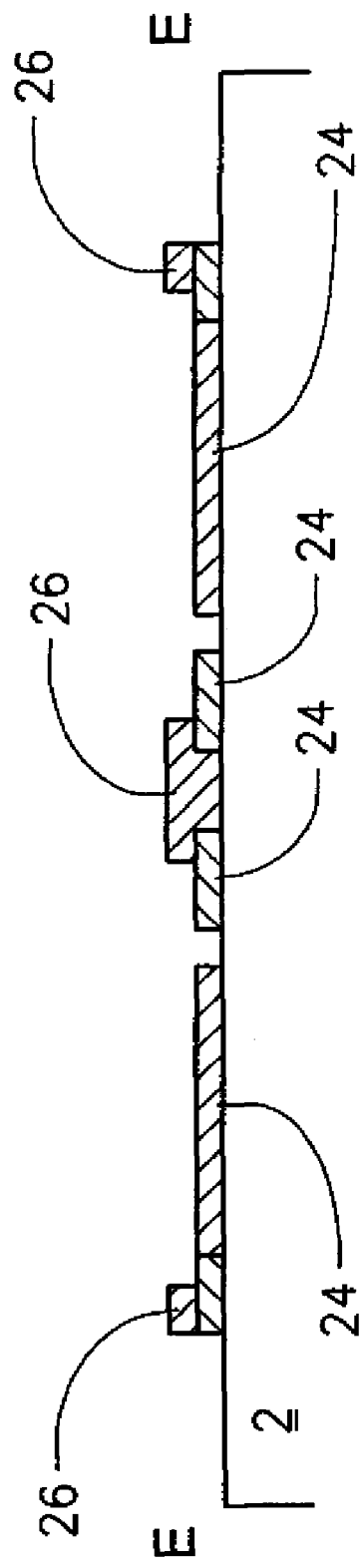
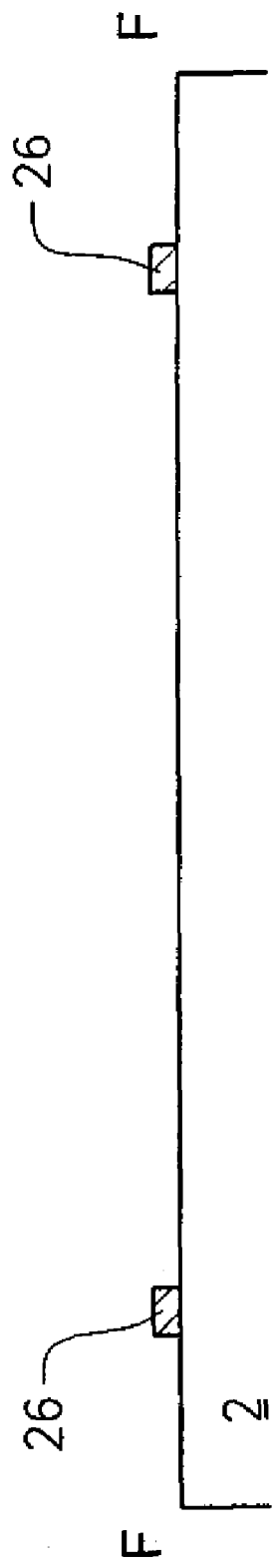
FIG. 12a
FIG. 12b

SEALED MONOLITHIC PHOTO-ELECTROCHEMICAL SYSTEM AND A METHOD FOR MANUFACTURING A SEALED MONOLITHIC PHOTO ELECTROCHEMICAL SYSTEM

RELATED APPLICATIONS

This application is a nationalization under 35 U.S.C. 371 of PCT/EP2007/052927, filed Mar. 27, 2007 and published as WO 2007/110427 A1, on Oct. 4, 2007, which claimed priority under 35 U.S.C. 119 to European Patent Application Serial No. 06006274.2, filed Mar. 27, 2006; which applications and publication are incorporated herein by reference and made a part hereof.

TECHNICAL FIELD

Example embodiments relate to a sealed monolithic photo-electrochemical system. More specifically, example embodiments relate to a structure comprising an electrically insulating substrate, an electrically conducting pattern including carrier areas, a first set of contact paths connecting said carrier areas with a first terminal, and a second set of contact paths extending from a second terminal toward the contact portions. An array of porous structures is arranged on the carrier areas. Each porous structure comprises a working electrode, an insulating layer and a counter electrode.

Furthermore, example embodiments relate to a method of manufacturing a sealed monolithic electrochemical system. In particular, example embodiments relate to a method for manufacturing structures as described above, where electrochemical cells arranged in an array arranged on a substrate are formed of porous structures including a porous working electrode, a porous insulating layer positioned on top of and being in contact with the working electrode and a porous counter electrode positioned at least partly on top of and in contact with the insulating layer. The electrodes and insulating layer are preferably formed by sintering.

BACKGROUND ART

Monolithic electrochemical systems are previously known in the art. A monolithic electrochemical system is an electrochemical system where the working electrode and the counter electrode are assembled in a single integrated body. The working electrode and the counter electrode are separated by means of an intermediate layer of a porous insulating material.

The working and counter electrodes are made of porous structures and an electrolyte is at least partially filled in the porous structure, which is a monolithic structure comprising a layer forming the working electrode, a layer forming the counter electrode and an insulating layer separating the counter electrode from the working electrode.

An early example of a monolithic photo-electrochemical system is disclosed in WO97/16838 which relates to a battery of photovoltaic cells consisting of a monolithic assembly of a plurality of serial-connected photovoltaic cells.

Traditionally photo-electrochemical systems includes a first substrate provided with a first electrode and a second substrate provided with a second electrode. The first and second substrates are positioned such that the electrodes are facing each other while leaving a small gap in between. In order to ensure that the gap is of a magnitude within a desired range, a spacer can be used to separate the substrates by a certain distance. The system is sealed at the edges of the first and second substrate and between adjacent electrically connected cells to prevent the electrolyte from making connections between the cells. In order to create photo-electrochemical systems having uniform properties over the entire active area of the system that is over the complete area of the electrodes, it is essential that the distance between the electrodes are kept within a narrow range, which makes production difficult. In order to avoid the electrolyte from making contacts between adjacent cells, the horizontal positioning of the two substrates must be made with very high precision which makes production difficult. A further drawback with this traditional, bilithic type of photo-electrochemical system is that electrolyte normally has to be introduced after assembly of the system. The opening of the passages where the electrolyte is introduced must be well-sealed after the introduction of the electrolyte to prevent the electrolyte from leaking and e.g. water to penetrate the cell. Separate openings are required for each cell resulting in a large number of openings for a system with many cells which makes production difficult. Introduction of electrolyte via narrow passages into the essentially closed space between the substrates may lead to creation of air pockets in the system or to uneven distribution of electrolyte, which both deteriorate the quality of the system.

Monolithic electrochemical systems has shown to provide for a very compact and simple design, where construction of the electrochemical system is made possible without the necessity of the first substrate being positioned at a specific distance from the second substrate. In this case, the electrochemical system can be constructed by a multilayer structure being applied to a substrate, after which the electrochemical system is closed. The light absorbing dye and the electrolyte are preferably introduced before closing of the electrochemical system. The structure can suitably be closed by means of a flexible sheet of at least one polymer layer, which is preferably applied to said structure in the presence of heat and sub-atmospheric pressure.

Experiments with monolithic photo-electrochemical systems have shown that it is difficult to manufacture arrays of monolithic photo-electrochemical cells on a substrate such that the cells are given identical properties or properties within a desired range, even though they are manufactured simultaneously on the same substrate. A single photo-electrochemical cell is characterised by its current-voltage-characteristics. The current-voltage-characteristics for a cell vary with the light intensity and the light spectrum. Important data that describe the current-voltage-characteristics of a photo-electrochemical cell are the short-circuit current ($I_{sc}$), the open-circuit voltage ($U_{oc}$), and the maximum power point ($P_{max}$) which is the highest energy output the cell can give under the specific light conditions that were used in the measurement. The term fill-factor (ff) is often used to describe the curve as $ff=P_{max}/(U_{oc}*I_{sc})$. In order to reduce differences in the current-voltage-characteristics of individual cells arranged on a common substrate, the requirements on production tend to become increasingly stricter requiring higher quality of the purity of the chemical components, the production environment, and the production processes. Such measures lead to a much more expensive production. An important example is the necessity of having a perfect control of the deposition of the working electrode, the insulating layer, and the counter electrode, in order to avoid the counter electrode from partially penetrating the insulating layer touching the working electrode and/or the intermediate conducting layer on the substrate, causing energy losses and thus differences of the current-voltage characteristics of the individual cells on a common substrate. This becomes even more critical since a thin insulating spacer layer is desirable to obtain the best cell performance since it simplifies the diffusion of the redox-couple containing electrolyte between the two working and the counter electrodes.

The porous counter electrode of a monolithic photo-electrochemical system should: 1) be a good electrical conductor to avoid energy losses during electron transport through the counter electrode; 2) be a good catalyst for the redox-couple of the electrolyte, and 3) have a good adhesion to the intermediate conducting layer on the substrate. Experiments with monolithic photo-electrochemical systems have shown that it is difficult to combine these three properties in one counter-electrode material. When trying to combine these three properties in one porous counter electrode material, at least one has always performed insufficiently resulting in energy losses and thus reduced efficiency of the monolithic photo-electrochemical system.

The electrodes in a monolithic photo-electrochemical system are conventionally formed via selective deposition of pastes in e.g. screen-printing processes whereupon the electrodes are sintered in order to burn off organic residues of the pastes and to create the electrical contact between the particles of the porous electrodes. This is in prior art made in one sintering process after that the electrode layers have been deposited. Experiments with monolithic photo-electrochemical systems have shown that the properties of the working electrode and the counter electrode are depending of the sintering temperature and that different layers have different optimum sintering temperatures.

DISCLOSURE OF INVENTION

An object of the invention is to provide a monolithic photo-electrochemical system provided with a plurality of cells arranged on a common substrate, which monolithic photo-electrochemical system has improved efficiency in relation to prior art systems without imposing stricter requirements on the production processes, thereby enabling cost effective production of such electrochemical systems.

This object is achieved by a sealed monolithic system according to the characterising portion of claim 1. The invention is based on connecting a plurality of photo-electrochemical cells in parallel on the substrate rather than in series according to prior art solutions.

The invention is based on the following three observations:
1) The short-circuit current and the fill-factor vary between individual monolithic photo-electrochemical cells manufactured on the same substrate even though they are manufactured simultaneously, whereas the open-circuit voltage variations are much smaller for such cells.
2) The long-term stability, that is the performance of the cells over time, varies between individual monolithic photo-electrochemical cells manufactured on the same substrate even though they are manufactured simultaneously. The differences of the individual cells appear as different evolution of the short-circuit currents and/or fill-factor whereas the open-circuit voltages evolve more or less identical for such cells.
3) When a part of a monolithic photo-electrochemical cell is exposed to less light intensity than the remaining part of the cell through e.g. shading, the open-circuit voltage of the cell remains constant or decreases only slightly. The short-circuit current of the cell on the other hand decreases proportionally with the area that is exposed to less light. This can partly be explained by the fact that the short-circuit current in a monolithic photo-electrochemical cell is linearly increasing with the light intensity while the open-circuit voltage is logarithmically increasing with the light intensity. The small variations of the open-circuit voltage in the experiments, however, are smaller than the expected ones and indicate an unexpected and useful quality of the system.

In the event that the individual cells in a photo-electrochemical system are connected in parallel, that is the working electrodes of the cells are connected to a first terminal and the counter electrodes are connected to a second terminal, the current-voltage-characteristics of the system are given by adding the currents from each cell for each specific voltage over the terminals. In contrast, in the event the individual cells in an electrochemical system are connected in series, that is the counter electrode of a cell is connected to the working electrode in another cell, the current-voltage-characteristics of the system are given by adding the voltages over each cell for each current through the cell. As a result of the inventor's observations that monolithic photo-electrochemical cells manufactured on the same substrate already from the manufacturing day, or due to varying changes of the cells over time, have different current-voltage characteristics in terms of varying short-circuit currents and fill-factors, the energy losses, that is the maximum power output of the system in relation to the sum of the maximum power outputs of each cell in the system, will be smaller when connecting such cells in parallel compared to serial-connections, i.e. the maximum power point of parallel-connection of such cells will be larger than serial-connection. Experiments by the inventor have verified that monolithic photo-electrochemical systems with such variations in the current-voltage characteristics with cells arranged in parallel are more efficient than photo-electrochemical systems with such cells arranged in series. Instead of developing more elaborate production methods for decreasing the differences of the characteristics of the individual cells on a common substrate, the inventor has suggested to arrange the cells in parallel rather than in series as have been suggested in prior art solutions.

In the event of one or several cells in an array of serial-connected photo-electrochemical cells having lower short-circuit currents than, but more or less identical open-circuit voltage as, the other cells, such mismatched cells may be operated at currents higher than the short-circuit current of the mismatched cells. The cells will thus operate at negative bias and dissipate energy. In a parallel-connected system, such a situation does not exist, since the current-voltage-characteristics of the system are given by adding the currents through each cell for the voltage levels of the current-voltage characteristics. In contrast, in the event of one or several cells in an array of parallel-connected photo-electrochemical cells having lower open-circuit voltage than, but more or less identical short-circuit current as the other cells, the cell with lower open-circuit voltage may be operated in a system with parallel-connected cells at voltages higher than the open-circuit voltage of the mismatched cell. The cells may thus operate at negative currents and dissipate energy. In a serial-connected system, such a situation does not exist since the current-voltage-characteristics of the system are given by adding the voltages over each cell for each current through the cells. As a result of the observations of the inventor that monolithic photo-electrochemical cells manufactured on the same substrate already from the manufacturing day, or due to varying changes of the cells over time, have different current-voltage characteristics in terms of varying short-circuit currents and fill-factors but very similar open-circuit voltages, the situation with cells dissipating energy will be much less occurring in a parallel-connected system than in a serial-connected one.

When a photo-electrochemical system is installed outdoors for the purpose of conversion of light to electric energy, it is likely that parts of certain solar cells, arranged on a common substrate will temporarily be positioned in the shade while the remaining parts are positioned under direct sunlight. As an effect of the inventor's observation that the open-circuit voltage is constant or only slightly decreases when a cell is partially or completely shaded, parallel-connections of cells should lead to less energy losses in the situation of partial shading of a monolithic photo-electrochemical system with an array of cells on the same substrate, in comparison to serial-connected cells. This has lead to experiments by the inventor verifying that, in the case of partial shading of one or several cells in an array of connected cells, more of the generated energy by the individual cells will be available as output from the system of connected cells when the cells are arranged in parallel in comparison to the case where the cells are connected in series.

Furthermore, in the event of a single cell or some of the cells in a photo-electrochemical system, where the cells are serial-connected on a common substrate, which is used as a device for conversion of light into electric energy, is at least partially positioned in the shade or if one or some of the cells have lower short-circuit current than the others, due to differences from the origin of the cells or due to different ageing of the cells, the current will pass through this or these cells under reverse bias, that is negative polarity, when the system is operated at currents higher than the short-circuit current of the this or these cells cell. This may lead to degradation of the cell and will certainly lead to reduced efficiency of the system since energy is dissipated in cells under reverse bias. In a monolithic photo-electrochemical system where the cells are connected in parallel, the risk for occurrence of this problem is much smaller due to three observations of the inventor: 1) the open-circuit voltage of a partly shaded monolithic photo-electrochemical cell remains constant or decreases slightly in relation to the non-shaded situation, 2) the open-circuit voltage is approximately constant for cells manufactured on a common substrate, and 3) the open-circuit voltages for cells manufactured on the same substrate evolve much more evenly than the short-circuit currents. As a consequence of this, cells operating at reverse bias due to partial shading can be avoided much more efficient when the cells are arranged in parallel in comparison to the case where the cells are connected in series, resulting in higher power output and longer life of the system.

Preferred embodiments are disclosed in the dependent claims.

The counter electrode has a first end portion which extends down to and is in contact with contact paths leading to a terminal. In a first particularly preferred embodiment portion the counter electrode includes a contact layer having a different composition than the remaining part of the counter electrode which contact layer is positioned at the first end portion and is in contact with a contact portion connected to said contact paths. The contact layer has different properties than the remaining parts of the counter electrode. The material forming the contact layer is selected to adhere better to the contact portion and/or substrate than the material selected to form the remaining part of the counter electrode.

By sintering the working electrode and the counter electrode in two different sintering processes, it is possible to optimise the sintering processes for respective electrode. The sintering process for the working electrode, which is preferably formed by a $TiO_2$ composition is preferably made at a temperature of approximately 450° C., while the sintering process for the counter electrode, which is preferably made of carbon is sintered at approximately 390° C. By sintering the counter electrode of carbon at a lower temperature, a significantly lower resistance of the counter electrode is obtained. This results in less energy losses caused by the electron transport through the counter electrode in a monolithic photo-electrochemical cell and thus in higher cell efficiencies.

In a preferred embodiment of the invention, the counter electrode is deposited on the substrate in a first and a second process step where a contact layer for the counter electrode is applied in the first step and the remaining part of the counter electrode in a second step. By introducing a contact layer, increased adherence between the counter electrode and the contact path and/or substrate may be achieved without negative effect on the conductivity of the remaining part of the counter electrode.

BRIEF DESCRIPTION OF DRAWINGS

Embodiments of the invention are described in further detail below with references to appended drawings, where FIG. 1 shows a substrate carrying an electrically conducting layer in view from above FIG. 2 shows a cross section at the line A-A of the substrate in FIG. 1, FIG. 3 shows a monolithic system arranged on a substrate as shown in FIG. 1, FIG. 4 shows a cross section at the line B-B of the monolithic system in FIG. 3, FIG. 4a shows part C of FIG. 4 in greater detail, FIG. 5 shows a second embodiment of an electrically conducting pattern arranged on a substrate.

FIG. 6 shows a cross section along line D-D through the substrate shown in FIG. 5

FIG. 12a, b shows cross sections along line D-D and E-E through the substrate shown in FIG. 5

Figure 8:
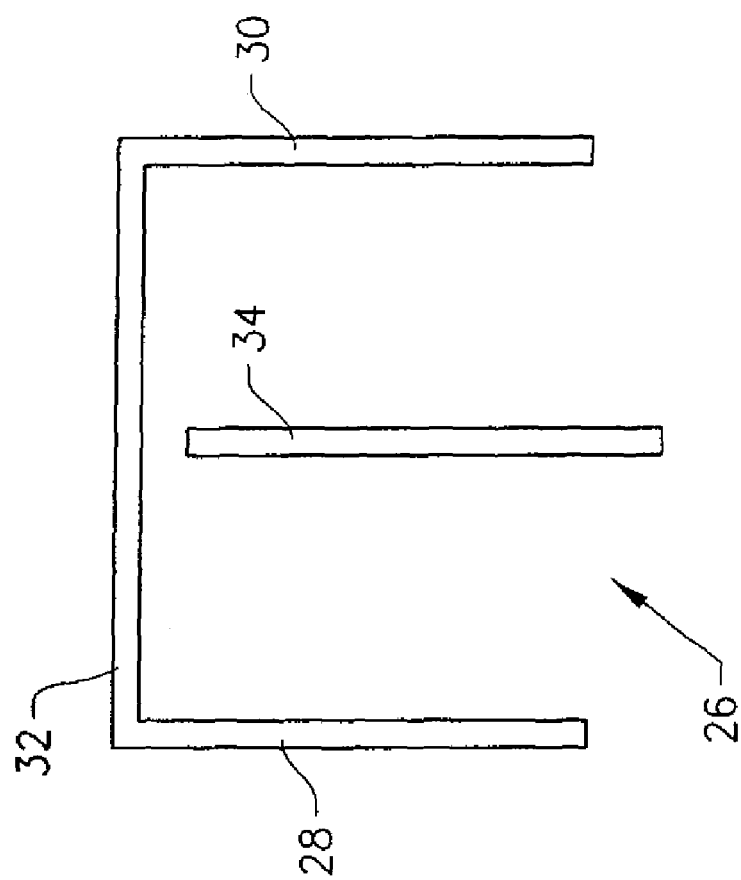
FIG. 8 shows conductors included in the first and second set of contact paths.

The drawings described are only schematic and are non-limiting. In the drawings, the size of some of the elements may be exaggerated and not drawn on scale for illustrative purposes. In particular the thickness dimension of the plurality of layers including carrier areas, counter electrode, insulating layer and working electrode are greatly exaggerated in comparison to the horizontal extension of each of the layers.

EMBODIMENT(S) OF THE INVENTION

FIG. 1 shows a substrate 2 for a monolithic electrochemical system 1. Suitable substrates are well known in the art and may preferably be made of glass or plastic material. The substrate carries an electrically conducting pattern 3 including carrier areas 4 arranged to support working electrodes 12, contact portions 10 connected to counter electrodes 14, a first set of contact paths 5 connecting said carrier areas 4 with a first terminal 6, and a second set of contact paths 7 connecting said contact portions 10 with a second terminal 8. The electrically conducting pattern 3 may be provided in the form of a structured pattern in an intermediate layer of conducting material. Intermediate layers suitable for production of electrochemical systems are well known in the art. The substrate and the pattern of electrically conducting material may suitably be provided as a laser-structured TCO glass plate (e.g. TEC 15 Ohm/square from Hartford Glass). In the substrate as shown in FIG. 1, the electrically conducting pattern is constituted entirely by a structured pattern of an intermediate conducting material. The pattern of electrically conducting material may also, as is disclosed in the embodiments disclosed in relation to FIGS. 13a, 13b, 14 and 15a, 15b include conducting contact portions arranged on top of the working electrodes or on top of the counter electrode.

In the example shown in FIG. 1, the intermediate layer includes a first and a second rectangular portion forming the carrier area 4. In between the carrier areas 4 a conductive area forming contact portions 10 and part of the second set of contact paths 7. The conductive area extends to a second terminal 8 for connection to an external electrical circuit. Furthermore, the carrier areas are provided with an extension forming part of the first set of contact paths 5 leading to a first terminal 6. Here in this example, the separation between the contact portions 10 and the contact path 7 leading to the second terminal 6 is purely virtual, since the contact path and contact area both form part of a single uninterrupted area formed in the intermediate layer. Furthermore the separation between the carrier areas 4 and the contact path 5 leading to the first terminal 6 is purely virtual, since the contact path and carrier area both form part of a single uninterrupted area formed in the intermediate layer. The areas may be formed by selectively removing the intermediate layer by e.g. laser-structuring or chemical etching according to conventional methods, or by selectively applying the intermediate layer via e.g. screen-printing.

FIG. 2 shows a cross section along the line A-A of the substrate in FIG. 1. The substrate 2 carries the electrically conducting pattern 3, which is formed by a structured intermediate layer of conducting material positioned on the substrate. The virtual separation between the carrier areas 4 and part of the first contact path 5 and the virtual separation between the contact portion 10 and part of the second set of contact paths 7 are shown. The separation is virtual in the sense that the contact portion 10 and the second contact path 7 are made of a continuous uninterrupted layer of conducting material. In the same sense the separation between the carrier area 4 and the first set of contact paths 5 is virtual since the carrier areas 4 and the first set of contact paths 5 are made of a continuous uninterrupted layer of conducting material. The carrier area 4 and the contact portion 10 are separated by a gap 9.

In FIG. 3, a monolithic photo-electrochemical system 1 built on a substrate as shown in FIG. 1 is shown. The monolithic photo-electrochemical system 1 includes an array of porous structures $11_1$-$11_{2n}$ arranged on the substrate 2. In the photo-electrochemical system shown in FIG. 3, the array is exemplified by an array which consists of two porous structures. In reality it is preferred to locate at least one row of porous structures positioned side by side and extending along the entire, or a substantial part of the, width of the substrate. An embodiment of such a structure is shown in FIG. 13. As shown in FIG. 4, which is a cross section along the line B-B of the system shown in FIG. 3, each porous structure 11 comprises a working electrode 12, an insulating layer 13 and a counter electrode 14. An electrolyte is at least partially filled in the porous structures 11 in order to form a photo-electrochemical cell. The working electrode 12 is positioned on top of the carrier area. The insulating layer 13 is positioned on top of the working electrode and is preventing the working electrode from coming into contact with the counter electrode 14 which is positioned on top of the insulating layer. The counter electrode 14, the insulating layer 13, and the working electrode 12 are all formed by porous nanostructured materials formed into an integrated monolithic porous structure.

The insulating layer 13 has a first end portion 16 which may be extended down to and in contact with the gap 9 between the carrier area 4 and the contact portion 10 of said second set of contact paths 7 such that the working electrode is isolated from the second set of contact paths. The contact portions 10 connect the counter electrodes 14 electrically with the second set of contact paths. The widths of the contact paths 7 and the contact portions 10 should be as small as possible to allow the working electrode or photo electrode 12 to cover as large portion as possible of the surface area of the substrate such that the photo-electrochemical system may absorb light from as much device area as possible.

The counter electrode 14 has a first end portion 17 which extends down to and is in contact with the contact portion 10 of the second set of contact paths 7 such that the counter electrode 14 is in electrical contact with the second set of contact paths 7. In a preferred embodiment of the invention the end portion 17 includes a contact layer 18 having a different composition than the remaining part of the counter electrode 14. The different composition is selected to adhere more strongly to the contact portions 10 than the remaining part of the counter electrode. In an embodiment the different composition is selected as a composition containing a higher content of carbon black than in the remaining part of the counter electrode. In a preferred embodiment the contents in the contact layer is 1 part carbon black and 4 parts graphite and in the remaining part of the counter electrode the content is selected as 1 part carbon black and 25 parts graphite. The counter electrode may additionally have improved catalytic due to additives such as platinum. The contact portion 10 is thus the part of the electrically conducting pattern which is in contact with the counter electrode. The carrier areas 4 are the part of the electrically conducting pattern which is in contact with the working electrodes 12.

The need for ensuring that the counter electrode adheres more strongly to the contact paths is also essential for electrochemical systems having a single cell arranged on a substrate or for electrochemical systems having a plurality of cells arranged in series on a common substrate. An electrochemical system making use of this idea may generally be described as a sealed monolithic electrochemical system comprising an electrically insulating substrate, an electrically conducting pattern arranged on said substrate and including at least one carrier area, a first set of contact paths connecting said at least one carrier area with a first terminal, and a second set of contact paths extending from a second terminal toward said at least one carrier areas and leaving a gap in between the carrier area and contact portions of said second set of contact paths, at least one porous structure arranged on said at least one carrier area, where said at least one porous structure comprises a working electrode, an insulating layer and a counter electrode, an electrolyte at least partially filled in said at least one porous structure for forming at least one electrochemical cell and a sealing material located on said substrate and covering said at least one porous structure wherein said counter electrode has a first end portion which extends down to and is in contact with said contact portion of said second set of contact paths such that the counter electrode is in contact with the second set of contact paths, and said end portion includes a contact layer having a different composition than the remaining part of the counter electrode.

A suitable method for producing electrochemical systems of any type such as electrochemical systems having a single cell arranged on a substrate, or electrochemical systems having a plurality of cells arranged either in series or in parallel on a common substrate, which systems are provided with counter electrode which adheres more strongly to the contact may be produced by a) forming an electrically conducting pattern on a substrate (2), said pattern including carrier areas (4),
b) covering at least partly each carrier areas (4) with a semiconducting material for forming working electrodes (12),
c) covering the semiconducting material intended to form the working electrodes (12) with an insulating material intended to form an insulating layer (13) between each working electrode and counter electrode (14),
d) covering the insulating material at least partly with a conducting material intended to form counter electrodes (14) which counter electrodes (14) are coupled to contact portions (10), wherein the step d) of forming the counter electrodes (14) includes a first step d1) of applying a contact material (18) arranged to adhere the counter electrode (14) to contact portions (10) and a second step d2) of applying conducting material to form the remaining part of the counter electrode (14).

An electrolyte is at least partially filled in said porous structures $11_1, \ldots 11_{2n}$ whereby a plurality of electrochemical cells are formed. The electrolyte may be applied by absorption in the porous structure by e.g. a dispensing or a printing process.

As indicated in FIG. 4, a sealing material 15 covers the array of porous structures $11_1, \ldots 11_{2n}$. The encapsulation of the cells may preferably be performed by applying a thermoplastic material such as SURLYN® or a thermosetting resin such as EVASAFE® as sealant, and making use of a vacuum/heat process as described in patent application WO 01/97237. Other type of encapsulations of the cells are also possible, e.g., so-called glass-frits. These are typically applied on a second substrate via e.g., screen-printing, positioned towards the substrate carrying the monolithic photo-electrochemical system in order to cover the monolithic photo-electrochemical cells, and sintered at a temperature exceeding 400° C.

The carrier areas 4 may preferably be rectangular in shape. The contact portions 10 of the second set of contact paths 7 are preferably formed to extend essentially along the entire length of one of the sides of the carrier areas.

The electrochemical cells shown in all embodiments of the invention have cells connected in parallel. This mean that carrier areas carrying the plurality of working electrodes are directly connected to the first terminal and that contact portions connecting the plurality of counter electrodes are directly connected to the second terminal.

As shown in FIGS. 3 and 4 an array of porous structures $11_1, \ldots 11_{2n}$ are arranged on the carrier areas 4. Each porous structure 11 comprises a working electrode 12, an insulating layer 13 and a counter electrode 14. Suitable materials for working electrodes, the insulating layer and counter electrodes are well known in the art. An electrolyte fills at least partially the porous structure.

As shown in FIG. 4 and the enlargement of part C of FIG. 4 shown in FIG. 4a, the counter electrode 14 has a first end portion 17 which extends down to and is in contact with the contact portion 10 of the second set of contact paths 7 such that the counter electrode 14 is in electrical contact with the second set of contact paths. The counter electrode is thus constituted by an essentially flat top portion 20 positioned on top of the insulating layer and a bent first end portion 17 which covers the edge 22 of the insulating layer and extends down toward and is in contact with the gap 9 in between carrier area 4 and the contact portion 10.

In a preferred embodiment of the invention the end portion 17 includes a contact layer 18 having a different composition than the remaining part of the counter electrode 14. The different composition is selected to adhere more strongly to the contact portions 10 than the remaining part of the counter electrode. In an embodiment the different composition is selected as a composition containing a higher content of carbon black than in the remaining part of the counter electrode. In a preferred embodiment the contents in the contact layer is 1 part carbon black and 4 parts graphite and in the remaining part of the counter electrode the content is selected as 1 part carbon black and 25 parts graphite. Additionally, the remaining part of the counter electrode may be platinised to increase its catalytic properties, The need for ensuring that the counter electrode adheres more strongly to the contact paths is also essential for monolithic electrochemical systems having a single cell arranged on a substrate or for electrochemical systems having a plurality of cells arranged in series on a common substrate. An electrochemical system making use of this idea may generally be described as a sealed monolithic electrochemical system comprising an electrically insulating substrate and at least one porous structure arranged on said substrate, where said at least one porous structure comprises a working electrode, an insulating layer and a counter electrode, an electrolyte at least partially filled in said at least one porous structure for forming at least one electrochemical cell and a sealing material located on said substrate and covering said at least one porous structure wherein said counter electrode has a first end portion which extends down to and is in contact with a contact portion of a set of contact paths such that the counter electrode is electrically connected to the set of contact paths, and said end portion includes a contact layer having a different composition than the remaining part of the counter electrode.

The at least one electrochemical cell is preferably connected to the terminals via an intermediate layer of an electrically conducting material located on the substrate. The intermediate layer may preferably be formed in a pattern including at least one carrier area, a first set of contact paths connecting said at least one carrier area with a first terminal, and a second set of contact paths extending from a second terminal toward said at least one carrier area and leaving a gap in between the carrier area and contact portions of said second set of contact paths.

In FIG. 5 a second embodiment of an electrically conducting pattern 3 is shown. In this embodiment the electrically conducting pattern includes a structured conducting intermediate layer 24 shaped in the same manner as in the embodiment shown in FIG. 1. The structured intermediate conducting layer 24 includes carrier areas 4, a first set of contact paths 5 connecting the carrier areas 4 with a first terminal 6, contact portions 10 and a second set of contact paths 7 connecting the contact portions 10 with a second terminal 8. In order to reduce losses in the first and second set of contact paths 5,7, these paths include conductors 26 of highly conducting material having a lower resistivity than a first material which forms the intermediate conducting layer. The conductors are preferably made of metal, such as for instance silver, cupper, aluminium or any alloys made thereof. In a preferred embodiment the conductors 26 are made of silver and the intermediate conducting layer is made of Fl-doped $SnO_2$. Other options for the conductors are all well electrically conducting materials. Other options for the intermediate conducting layer are e.g. Sn-doped indium-oxide (ITO) or doped zinc-oxide. Preferably, the conductors 26 and the intermediate layer 24 are chemically compatible to the electrolyte that at least partly fills the porous structures of the photo-electrochemical system. In this manner the conductors 26 and the intermediate layer 24 may be exposed to the electrolyte without risk of degradation. A non-chemical compatibility between the electrolyte and the conductors 26 will lead to degradation of the device performance over time and decrease the life length. A conventional electrolyte in a photo-electrochemical cell contains the redox couple iodide/tri-iodide, often dissolved in an organic solvent. However other redox-couple and electrolyte variations are possible to use and thus included. Conductors 26 that are chemically compatible with the typical iodide/tri-iodide containing electrolytes are e.g. titanium and nickel. However, all other combinations of electrolytes and conductors that are chemically compatible with each other are included.

Generally the methods disclosed above allows for the fabrication of a sealed monolithic photo-electrochemical system comprising an electrically insulating substrate, an electrically conducting pattern including carrier areas arranged to support working electrodes, the system furthermore comprises an array of porous structures arranged on said substrate, where each porous structure comprises a working electrode, an insulating layer and a counter electrode, an electrolyte at least partially filled in said porous structures for forming a plurality of electrochemical cells and an encapsulation covering said array of porous structures, where an active area covered by working electrodes cover more than 70% of the total area of the substrate for substrates carrying a plurality of porous structures, each forming a cell. In particular, where the conductors 26 and the intermediate layer 24 are chemically compatible to the electrolyte that at least partly fills the porous structures of the photo-electrochemical system or where the intermediate layer 24 are chemically compatible to the electrolyte while the conductors 26 are covered by the intermediate layer, as disclosed in FIGS. 13*a*, 13*b* and 15*a*, 15*b*, the active area covered by working electrodes may cover more than 90% of the total area of the substrate for substrates carrying a plurality of porous structures, each forming a cell.

The system furthermore includes contact portions connected to counter electrodes. The system may preferably have the cells connected in parallel whereby a first set of contact paths connecting said carrier areas with a first terminal, and a second set of contact paths connecting said contact portions with a second terminal.

The conductors 26 in the first set of contact paths 5 has a first and last extensions 28, 30 extending from a base 32 along a side portion of the carrier area 4. The conductors in the second set of contact paths is provided with an intermediate extension 34 extending along the contact portions 10 along the length of the cells which are deposited on the carrier areas 4 and being connected to the contact portions 10.

FIG. 6 shows a cross section along line D-D through the substrate shown in FIG. 5. It is shown that the conductors 26 are arranged on top of the intermediate conducting layer 24.

Figure 7:
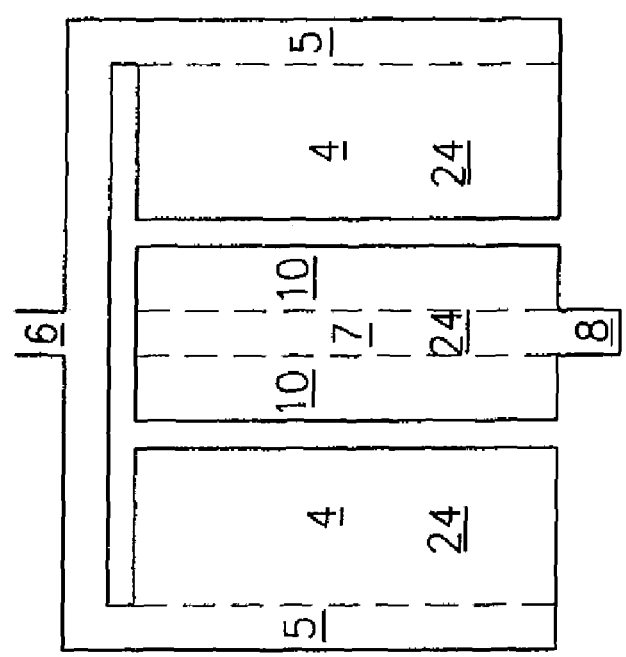
FIG. 7 shows an intermediate layer forming carrier areas and contact portions.

In FIG. 7 the intermediate conducting layer 24 with carrier areas 4, contact portions 10 and first and second conducting paths 5, 7 is shown when the substrate 2 and the conductors are removed. This intermediate layer 24 may be used as the electrically conducting pattern of the first embodiment. In the second embodiment shown in FIG. 5 conductors 26 in the shape shown in FIG. 8 are arranged on top of the intermediate layer.

Figure 10:
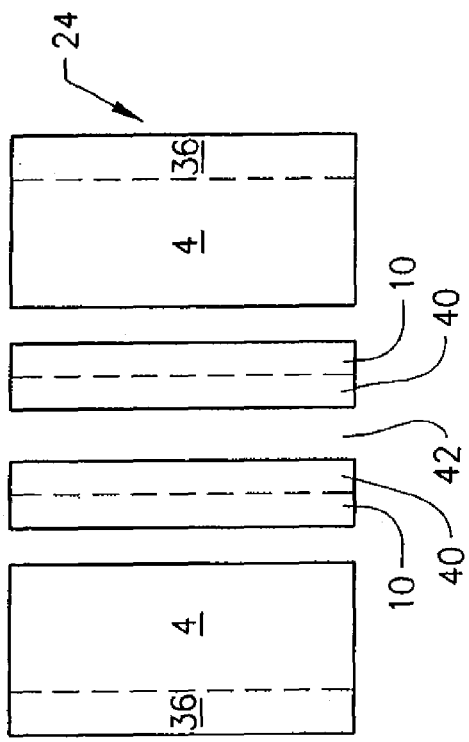
FIG. 10 shows the intermediate layer forming carrier areas and contact portions of the embodiment shown in FIG. 9.
Figure 11:
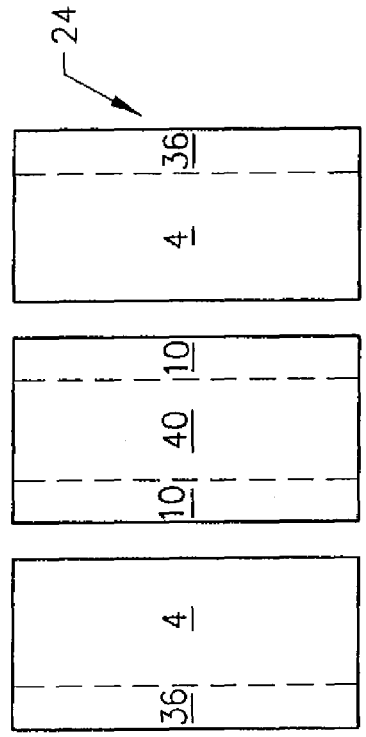
FIG. 11 shows the intermediate layer forming carrier areas and contact portions of the embodiment shown in FIG. 9 with an alternative arrangement of the shape of an intermediate layer in the area in between two carrier areas.
Figure 9:
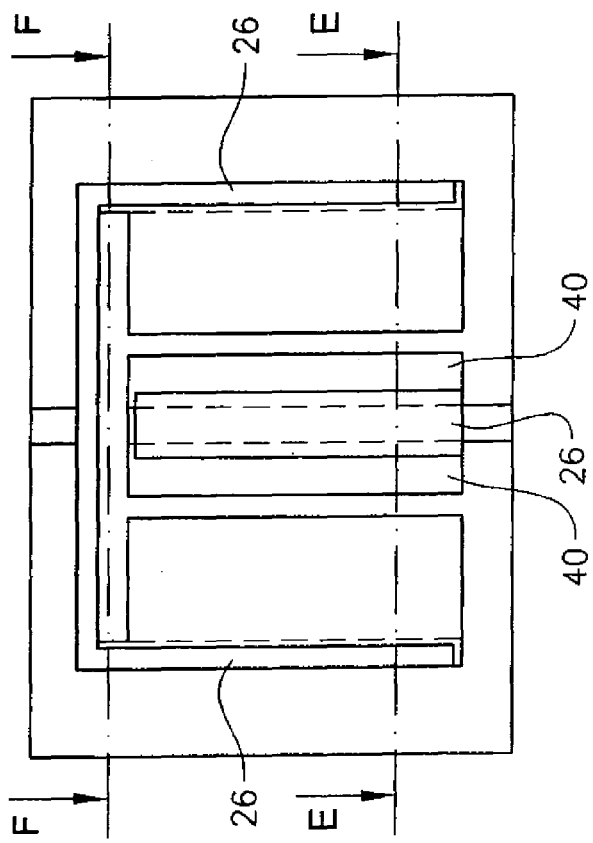
FIG. 9 shows a third embodiment of an electrically conducting pattern arranged on a substrate.

In FIG. 9 a third embodiment of an electrically conducting pattern 3 arranged on a substrate 2 is shown. In this embodiment, contrary to the second embodiment where the conductors 26 are positioned on an intermediate conducting layer 24 along the entire length of the conductors 26, the conductors 26 are connected to an intermediate layer 24 only for the purpose of being in electrical contact with the carrier areas 4 and the contact portions. For this purpose the intermediate layer extends a bit out from the carrier area 4 forming first contact areas 36 and a bit out from the contact portion 10 forming second contact areas 40. The first contact areas 36 preferably extend at the edge of and along the length of the carrier areas 4, which preferably are elongated. The second contact areas 40 preferably extend at the edges of and along the length of the contact portion 10, which preferably is elongated. In the event two neighbouring cells has a common conductor 26 arranged in between the cells, the part of the intermediate layer 24 forming the contact portions 10 may be split in a first and a second portion 40 having a gap 42 in between as shown in FIG. 10, which gap is bridged by the conductor, or preferably be shaped as a continuous band onto which the conductor is arranged. The embodiment in FIG. 9 has conductors 26 resting directly on the substrate without being in contact with an intermediate layer along part of their length, for instance along the base 32. The embodiment shown in FIG. 9 may be composed of an intermediate layer 24 as shown in FIG. 10 or alternatively FIG. 11 with carrier areas 4, first and second contact areas 36, 40 and contact portions 10, which intermediate layer is arranged on a substrate 2. In FIG. 11 the second contact areas are not separated by a gap. The conductors may also be arranged, as shown in FIG. 8, on top of the substrate and the intermediate layer FIGS. 12*a*, *b* show cross sections along line E-E and F-F through the substrate shown in FIG. 9. The figures shows that the conductors partly rests on the intermediate layer for connecting to the carrier areas and contact portions 10 respectively and that the conductors partly rest directly on the substrate 2. At the cross section F-F it is evident that the base 30 leading to the terminal rests directly on the substrate. From the cross section at E-E it may observed that the conductors are positioned on contact areas adjacent the carrier areas and contact portions for connecting said carrier areas and contact portions with the conductors leading to the terminals.

Figure 13A:
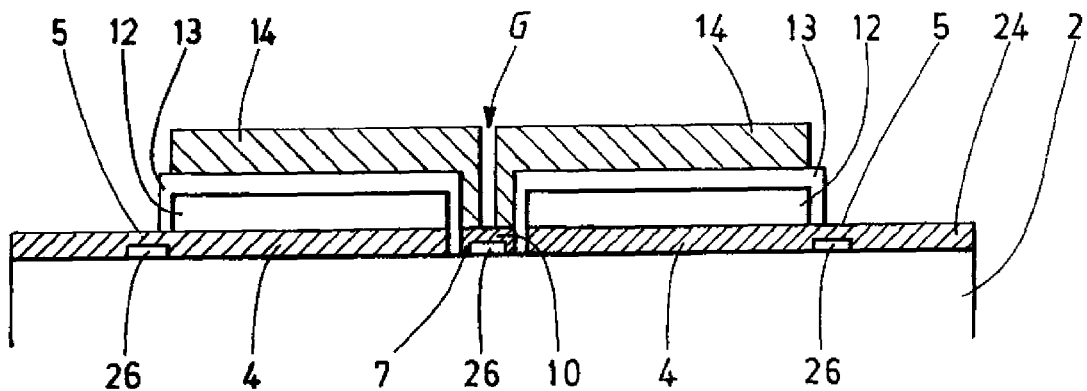
FIG. 13a,b shows a set of two monolitic photo-electrochemical cells arranged on a substrate where the conductors are placed under the intermediate layer
Figure 13B:
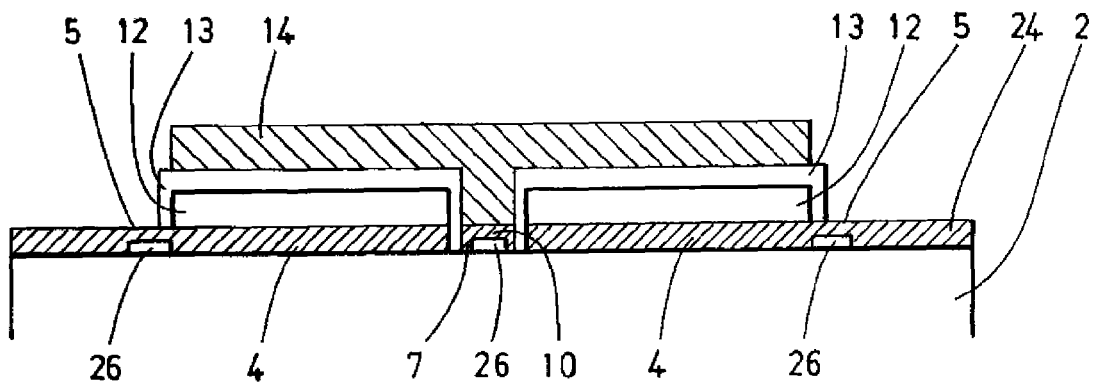

The conductors may also be placed under, but still in electrical contact with, the intermediate layer, as shown in FIG. 13*a*. This would make it possible to protect the conductors in order to only encapsulate around the contour of the system since there is no risk of the electrolyte being in contact with the conductors. In this case the sealed photo-electrochemical system 1 comprises an electrically insulating substrate 2, an electrically conducting pattern 3 including carrier areas 4 arranged to support working electrodes 12, contact portions 10 connected to counter electrodes 14, a first set of contact paths 5 connecting said carrier areas 4 with a first terminal 6, and a second set of contact paths 7 connecting said contact portions 10 with a second terminal 8, the system furthermore comprises an array of porous structures ($11_1$-$11_{2n}$) arranged on said substrate 2, where each porous structure 11 comprises a working electrode 12, an insulating layer 13 and a counter electrode 14, an electrolyte at least partially filled in said porous structures ($11_1$-$11_{2n}$) for forming a plurality of electrochemical cells and an encapsulation covering said array of porous structures ($11_1$-$11_{2n}$). Furthermore the first and second sets of contact paths 5, 7 are connecting said plurality of electrochemical cells in parallel. In the embodiment shown in FIG. 13a the counter electrodes 14 of the left and right cell on the substrate are separated by a gap G, which extends down to the contact portion 10. In this case, the sets of contact paths 5,7 thus include conductors 26 of highly conducting material that are placed under the intermediate layer 24. In this embodiment the contact portions 10 consist of the intermediate layer 24 that at least partly is on top of the conductor 26 of the counter electrode. The electrically conductive pattern thus consists of the structured intermediate layer 24 including carrier areas 4, contact portions 10, and a first and second set of contact paths 5,7. The counter electrodes 14 of the two adjacent cells may in this case be connected in one continuous layer, as illustrated in FIG. 13b. The continuous counterelectrode 14 according to the embodiment shown in FIG. 13b thus extends over two or more carrier areas, preferably over all carrier areas that share a common substrate The intermediate layer 24 is adapted to be exposed to the electrolyte solution, e.g. the two materials are chemically compatible. An example of such material is F-doped $SnO_2$. Since the conductors 26 are protected from the electrolyte by the structured intermediate layer 24, the conductors 26 must not be chemically compatible to the electrolyte solution. A preferable materials for the conductors is silver, however, all sufficiently well conducting materials may be used.

In the embodiments shown in FIGS. 13a and 13b the conductors 26 are protected from the electrolyte by the intermediate layer 24, which covers the conductors. It is therefore not necessary to arrange a seal for protection of the electrodes from the electrolyte in the event the electrodes 26 should be made of a material which is not chemically compatible with the electrolyte, that is of a material that will be degraded by the electrolyte during use.

In FIG. 13 a and b, the conductor 26 of highly conducting material in the first set of current path 5 are placed next to the working electrodes 12. However, the conductors may also be placed under a small part of the working electrode. In this case, the working electrode is thus applied on both the carrier areas and on the intermediate layer on top of the conductors resulting in that the working electrode consists of one continuous layer for two adjacent cells. Additionally, the conductors may include branches that run e.g. perpendicular from the conductor to the working electrode to improve the current collection from the working electrode.

Figure 14:
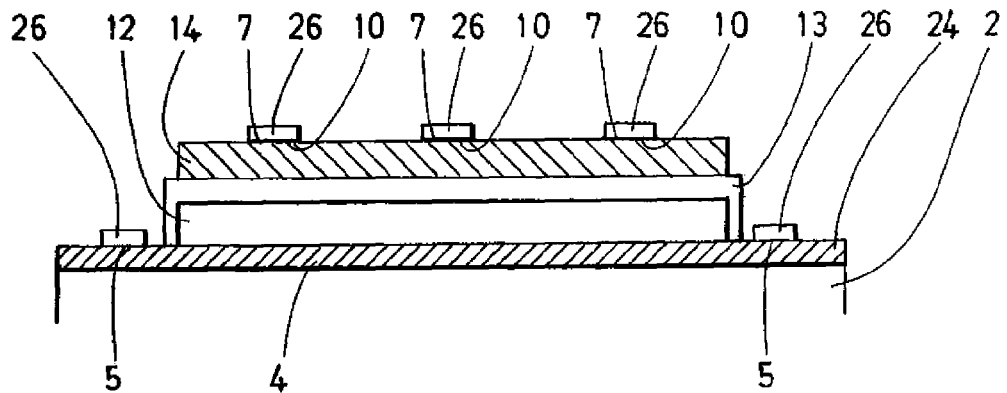
FIG. 14 shows a monolitic photo-electrochemical cell arranged on a substrate where the conductors are placed on the intermediate layer and on the counter electrode FIG. 15a,b shows a set of two monolitic photo-electrochemical cell arranged on a substrate where the conductors are chemically compatible with the electrolyte solution

As shown in FIG. 14, the conductors of the counter electrode may be placed on top of and in contact with the counter electrode as long as the conductors are chemically compatible to the cell components, especially the electrolyte. This would open for broader cells without additional energy losses, and thus a higher percentage of active working electrode area in the system. In this case, the contact portions may consist of a part of the upper surface of the counter electrode.

Figure 15A:
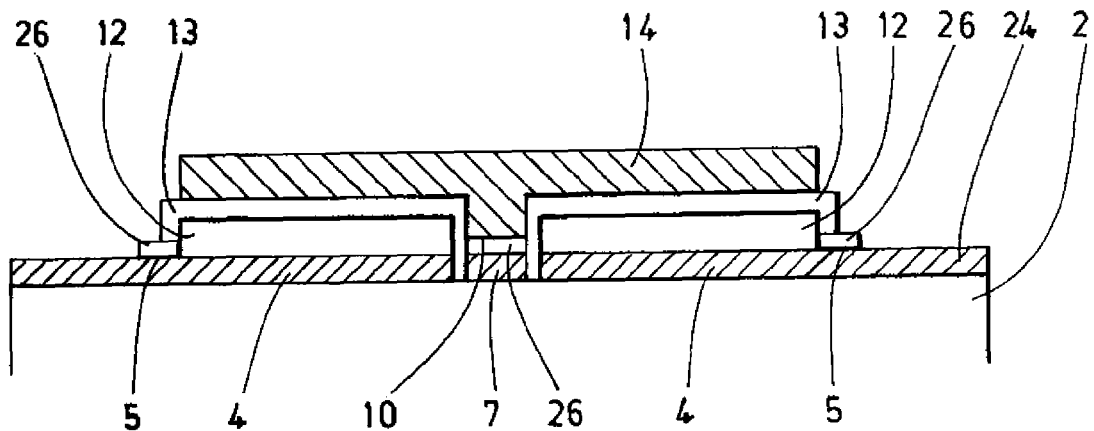

In this case, the sealed photo-electrochemical system 1 comprises an electrically insulating substrate 2, an electrically conducting pattern 3 including carrier areas 4 arranged to support working electrodes 12, contact portions 10 connected to counter electrodes 14, a first set of contact paths 5 connecting said carrier areas 4 with a first terminal 6, and a second set of contact paths 7 connecting said contact portions 10 with a second terminal 8, the system furthermore comprises an array of porous structures ($11_1$-$11_{2n}$) arranged on said substrate 2, where each porous structure 11 comprises a working electrode 12, an insulating layer 13 and a counter electrode 14, an electrolyte at least partially filled in said porous structures ($11_1$-$11_{2n}$) for forming a plurality of electrochemical cells and an encapsulation covering said array of porous structures ($11_1$-$11_{2n}$). Here, the first and second sets of contact paths 5, 7 are connecting said plurality of electrochemical cells in parallel. In the example shown in FIG. 14, the current paths 5 thus include conductors 26 on top of the intermediate layer 24. However, all mentioned embodiments for realising the current paths 5 could be used in this case. The second set of currents paths 7 are placed on top of the upper surface of the counter electrode 14 and includes a conductor 26. The working electrode 12 can in this case be broader since no gap between two adjacent cells are required since the contact portions 10, current paths 7, and conductors 26 of the counter electrode 14 are placed on top of the counter electrode 14. Thus, the electrically conducting pattern 3 includes in this case the contact portions 10 and the second set of contact paths 7 on the upper surface of the counter electrode 14, the carrier area 4 and the first set of contact paths 5 on the substrate. Here the conducting pattern is not made of a structured single intermediate layer 24, but also includes other parts of the system In the case where the sets of contact paths 5,7 include conductors 26 of highly conducting material that are chemically compatible with the electrolyte that at least partly fills the porous structure of the photo-electrochemical cells, the array of porous structures ($11_1$-$11_{2n}$) can be very closely packed as shown in FIG. 15a. A non-chemical compatibility between the electrolyte and the conductors 26 will lead to degradation of the device performance over time and decrease the life length. A conventional electrolyte in a photo-electrochemical cell contains the redox couple iodide/tri-iodide, often dissolved in a solvent. However other redox-couple and electrolyte variations are possible to use and thus included. The conductors 26 that are chemically compatible with the typical iodide/tri-iodide containing electrolytes are e.g. titanium and nickel. However, all other combinations of good conductors and electrolytes that are chemically compatible with each other are included. In this case, the sealed photo-electrochemical system 1 comprises an electrically insulating substrate 2, an electrically conducting pattern 3 including carrier areas 4 arranged to support working electrodes 12, contact portions 10 connected to counter electrodes 14, a first set of contact paths 5 connecting said carder areas 4 with a first terminal 6, and a second set of contact paths 7 connecting said contact portions 10 with a second terminal 8, the system furthermore comprises an array of porous structures ($11_1$-$11_{2n}$) arranged on said substrate 2, where each porous structure 11 comprises a working electrode 12, an insulating layer 13 and a counter electrode 14, an electrolyte at least partially filled in said porous structures ($11_1$-$11_{2n}$) for forming a plurality of electrochemical cells and an encapsulation covering said array of porous structures ($11_1$-$11_{2n}$).

Figure 15B:
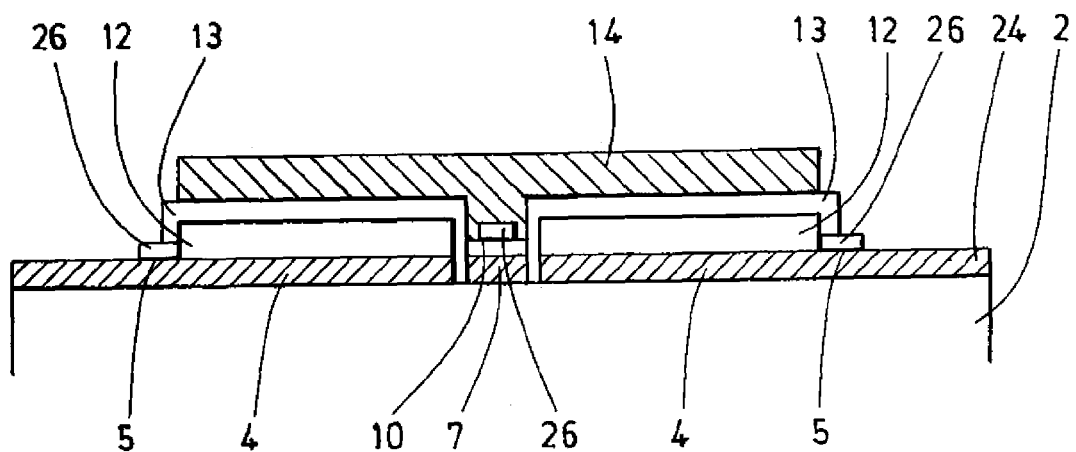

Here, the first and second sets of contact paths 5, 7 are connecting said plurality of electrochemical cells in parallel. This device construction results in a higher device efficiency since more of the device surface can be used for light-absorption. The counter electrode 14 may be applied directly on the conductors 26 as illustrated in FIG. 15a. In this case, the contact portion 10 consists of the upper part of the conductor 26. The counter electrode 14 may also be applied on both the intermediate layer 24 next to the conductor 26 and on the conductor 26 as illustrated in FIG. 15b. In this case, the contact portion 10 consists of the upper part of the conductor 26 and a part of the intermediate layer 24.

In FIG. 15 a and b, the conductors that are chemically compatible with the electrolyte solution that at least partly fills the porous structure, are in contact with the working electrodes. However, the conductors may also be placed at a certain distance from the working electrode. Another possibility is to place the conductors under a small part of the working electrode. In this case, the working electrode is thus applied on both the carrier areas and on top of the conductors resulting in a continuous working electrode layer for two adjacent cells. Additionally, the conductors may include branches that run e.g. perpendicular from the conductor to the working electrode to improve the current collection from the working electrode. These branches of the conductors may be placed next to the working electrode or under the working electrode.

All examples illustrated by FIGS. 1-13 and FIG. 15 are based on monolithic photoelectrochemical systems having cells with a shared contact path for the counter electrodes of two adjacent cells whereas the two working electrodes have two electrically connected contact paths along the long sides of the cells. This cell configuration can in all examples be mirror-inverted, i.e. two adjacent cells share one contact path for the working electrode whereas the two counter electrode have two electrically connected contact paths along the long sides of the cells. In these embodiments the counter electrode will be positioned at the location the working electrode of the embodiments showed in the appended drawings and the working electrode will be positioned at the location of the counter electrode of the embodiments showed in the appended drawings.

Figure 16:
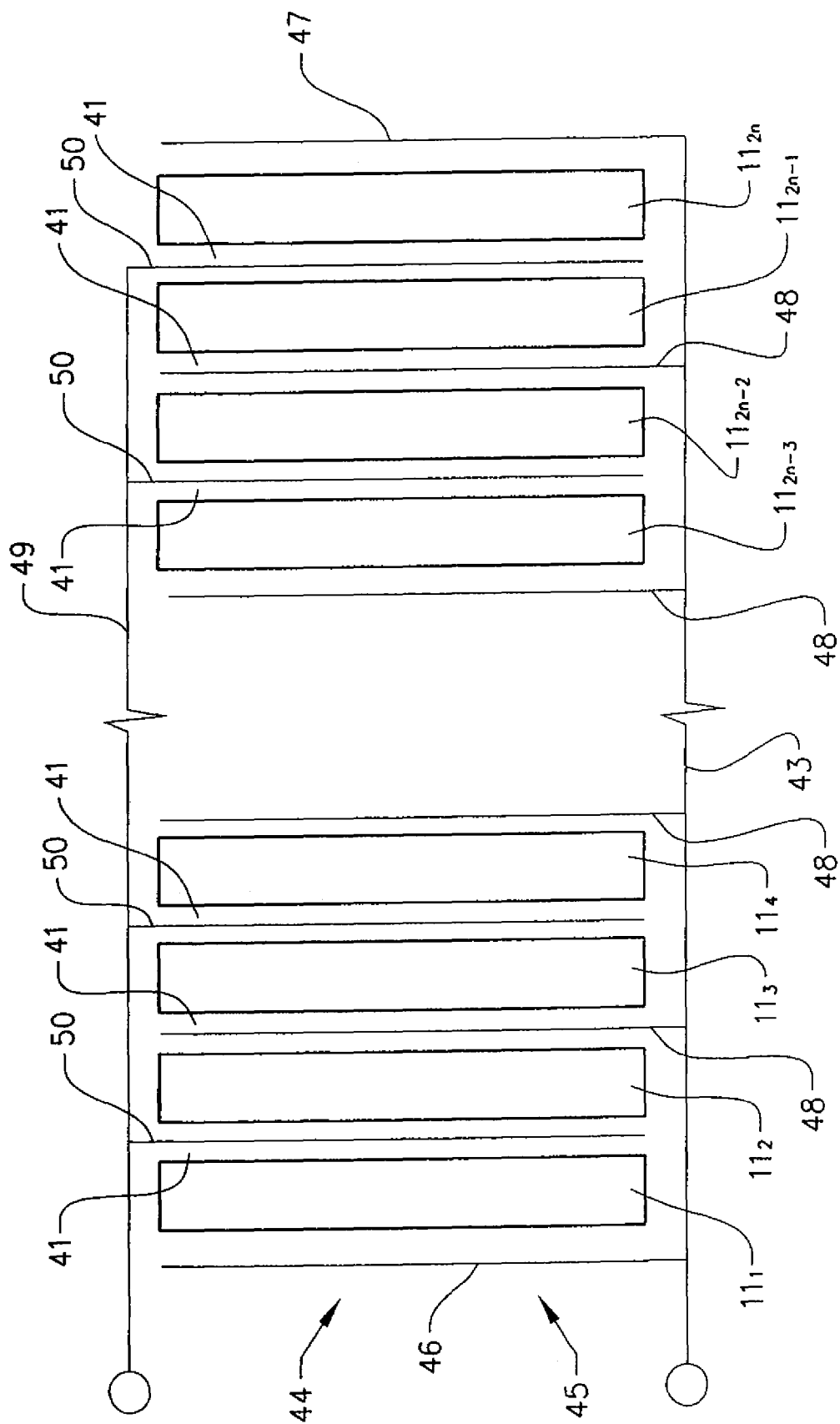
FIG. 16 shows a monolitic photo-electrochemical system including a plurality of cells arranged in a row of elongated cells separated by gaps.

In the examples where conductors of highly conducting material are used, the conductors consist of straight conductor paths placed parallel to the longer side of the electrodes. However, the conductors may also e.g. include a set of branches to improve the current collection from the electrodes. These branches may e.g. run perpendicular from a conductor of the first set of current paths to the working electrode to improve the current collection from the working electrode, or run perpendicular from the conductor of the second set of contact paths to the counter electrode to improve the current collection from the working electrode In FIG. 16, a monolitic photo-electrochemical system including plurality of cells arranged in a row 44 of elongated cells $11_1 \ldots 11_{2n}$ separated by gaps 41 is shown. In this embodiment the first and second sets of contact paths 5, 7 includes:
- a first base 43 which extends along said row 44 and a first set of extensions 45 connected to said first base 43; said first set of extensions 45 is including a first extension 46 extending before and alongside the first cell $11_1$ in the row 44, a last extension 47 extending after and alongside the last cell $11_{2n}$ in said row 44 and a first set of intermediate extensions 48 extending into every other gap 41 between the cells starting with the second gap such that said first base 43 and first set of extensions 45 forms comb shaped pattern (Ш);
- and a second base 49 which extends along said row, said first and second bases 43, 49 being positioned on opposite sides of the row 44, and a second set of intermediate extensions 50 connected to said second base 49 and extending into every other gap between the cells starting with the first gap such that said second base and second set of extensions forms comb shaped pattern (П).

Each intermediate extension 48, 50 is electrically connected to both adjacent cells. The first base and first set of extensions form part of one of the first or second set of contact paths, while the second base and second set of extensions form part of the other set of contact paths. That is, according to one embodiment the first base 43 and its extensions form part of the first set of contact paths, i.e. the working electrodes, while the second base 49 and its extensions form part of the second set of contact paths, i.e. the counter electrodes. In another alternative embodiment, one embodiment the first base 43 and its extensions form part of the second set of contact paths, i.e. the counter electrodes, while the second base 49 and its extensions form part of the first set of contact paths, i.e. the working electrodes.

The row of photo electrochemical cells are thus arranged such that all cells included in the row are connected to the first and second terminals in parallel.

Each individual cell in the row are elongated, preferably rectangular, in shape and are positioned side by side with the longer sides facing each other. The width of the cells are restricted since energy losses during the electron transport occur in the ohmic sheet resistance of the intermediate layer which carries the working electrode and the ohmic sheet resistance of the counter electrode. The carrier areas and contact portions are therefore connected to terminals via the conductors, which extend into the gaps between the electrodes. As the length of the cells grow, the dimension of the extensions 48, 50 must grow in order to ensure that losses are kept low. The width of necessary gap between the cells thus grows with an increased length of the cells. In order to provide maximum possible active area on a substrate it has shown that it is appropriate to shape the cells with a width of 5-10 mm and a length in between 30-200 mm.

It may be contemplated to produce a plurality of rows of cells as described above on a common substrate, where each row is connected either in parallel, in order to maximise the operating stability of the device, or in series, in order to enable a higher output voltage from the device.

In a first practical example, the rows are 15 cm broad and include 14 parallel-connected cells. In a second practical example, the rows are 60 cm broad and include 72 cells. The second example may also consist of four rows of 15 cm connected in series to increase the output voltage of the devices. The number of parallel-connected cells per row is thus preferably within the range of 14-72 cells. Generally a plurality of rows of parallel-connected cells may be arranged on a common substrate. The rows may be arranged side by side, that is the length direction of the cells in respective row are facing each other, or above or in under each other such that the width direction of the cells in respective row are facing each other. In the last example, two neighbouring rows may share a common base. The rows of cells may be connected in series or in parallel.

The invention also relates to a method of manufacturing a sealed monolithic electrochemical system, wherein the following method steps are performed, a) forming an electrically conducting pattern 3 located on a substrate 2, said pattern including carrier areas 4 and a first set of contact paths 5 connecting said carrier areas 4 with a first terminal 6, and a second set of contact paths 7 extending from a second terminal 8 toward said carrier areas 4 and leaving a gap 9 in between the carrier area 4 and contact portions 10 of said second set of contact paths 7, b) covering at least partly each carrier areas with a semiconducting material for forming working electrodes, c) covering the semiconducting material intended to form the working electrodes areas with an insulating material intended to form an insulating layer between each working electrode, d) covering the insulating material with a conducting material intended to form counter electrodes. The method is particularly characterised by that the working electrodes are formed by sintering the semiconducting material after having been deposited on the substrate at a first sintering process, the counter electrodes are formed by sintering in a second sintering process after said first sintering process and in that the temperature of the second sintering process is lower than the temperature of the first sintering process. The process described above may be used when producing a electrochemical systems having a single cell arranged on a substrate, for electrochemical systems having a plurality of cells arranged in series on a common substrate as well as electrochemical systems having a plurality of cells arranged in parallel on a common substrate.

The step a) of forming an electrically conducting pattern 3 located on a substrate 2, may be performed by structuring an intermediate layer of a conducting material arranged on the substrate for forming carrier areas 4 and a first set of contact paths 5 connecting said carrier areas 4 with a first terminal 6, and a second set of contact paths 7 extending from a second terminal 8 toward said carrier areas 4 and leaving a gap 9 in between the carrier area 4 and contact portions 10 of said second set of contact paths 7 In another embodiment the step a) includes application of conductors, which may or may not be in direct contact with the electrodes in different embodiments. It is possible to combine the use of application of conductors with the use of a structured intermediate layer. The conductors may be applied above or under the intermediate layer.

In a particularly preferred embodiment of the invention the step d) of forming the counter electrodes includes a first step d1) of applying a contact material arranged to adhere the counter electrode to the contact portions and a second step d2) of applying conducting material to form the remaining part of the counter electrode.

EXAMPLES

Typical Process Steps for Making a Parallel-Connected Monolithic Photo-Electrochemical Module 1. washing the conducting substrates
2. creating the current paths of the conducting layer of the substrate (e.g. laser-structuring)
3. application of the TiO2 layer (e.g. screen-printing)
4. sintering at 450° C.
5. application of spacer layer (e.g. screen-printing followed by drying)
6. application of the carbon adhesion layer (e.g. screen-printing followed by drying)
7. application of the carbon counter electrode layer (e.g. screen-printing followed by drying)
8. application of silver current collectors (e.g. screen-printing)
9. sintering 390° C.
10. dye application
11. electrolyte application
12. encapsulation (e.g. vacuum/heat lamination)

Comments:
  Many other variations are possible, e.g. step 8 could also be made e.g. after step 2, step 3, or step 4, and/or step 5 could be made after step 3
  One or several of the different layers may be applied by different methods than screen-printing, e.g. inc-jet printing.
  The two sintering steps may be combined as one (step 9). Two sintering steps have, however, resulted in better performance of the devices.
  The two carbon layers may be combined to one
  Other conducting substrates than glass may be used, e.g., polymers. This will, however, require lower sintering temperatures.
  Other encapsulation methods may require different process steps, e.g. the use of so-called glass-frits as sealing material.

In FIGS. 17 to 20 different tests performed on single cells and cells arranged in series and in parallel, showing that the inventive idea of arranging the cells in parallel provides electrochemical systems that are more efficient and less prone to degradation.

Figure 17:
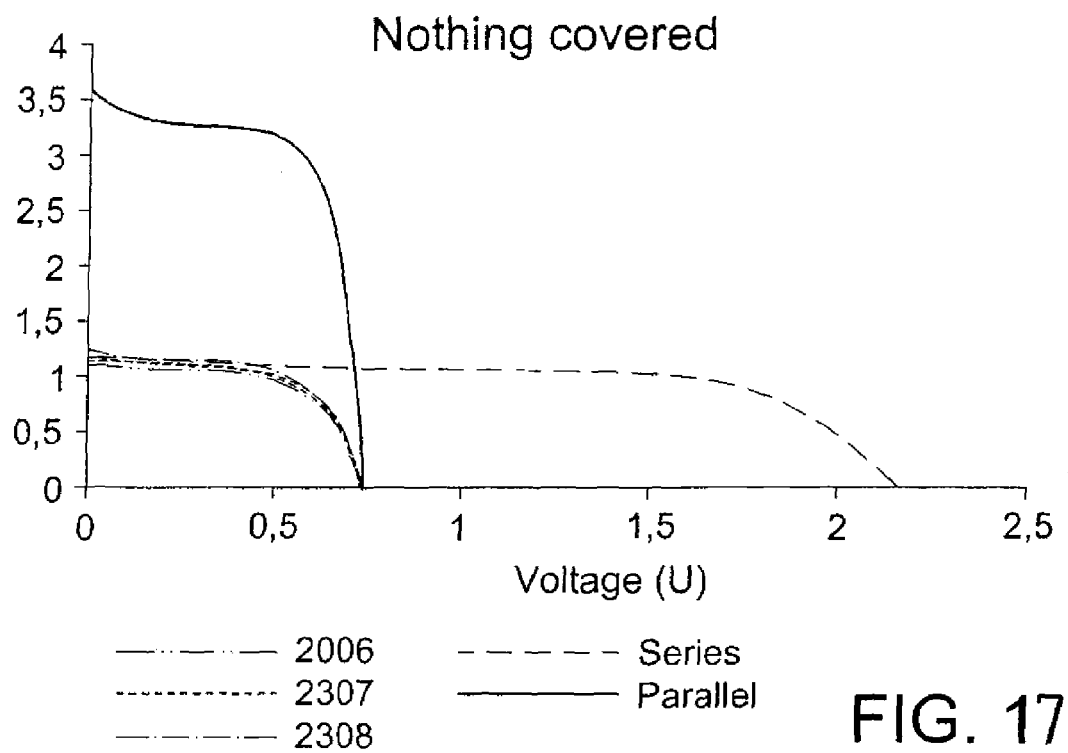
FIG. 17 shows current-voltage-characteristics for three more or less identical cells, individually, connected in series and connected in parallel.

In FIG. 17 the current voltage characteristics for three more or less identical cells, individually connected in series (addition of voltages for the currents), and connected in parallel (addition of currents for the voltage values) is shown.

Figure 18:
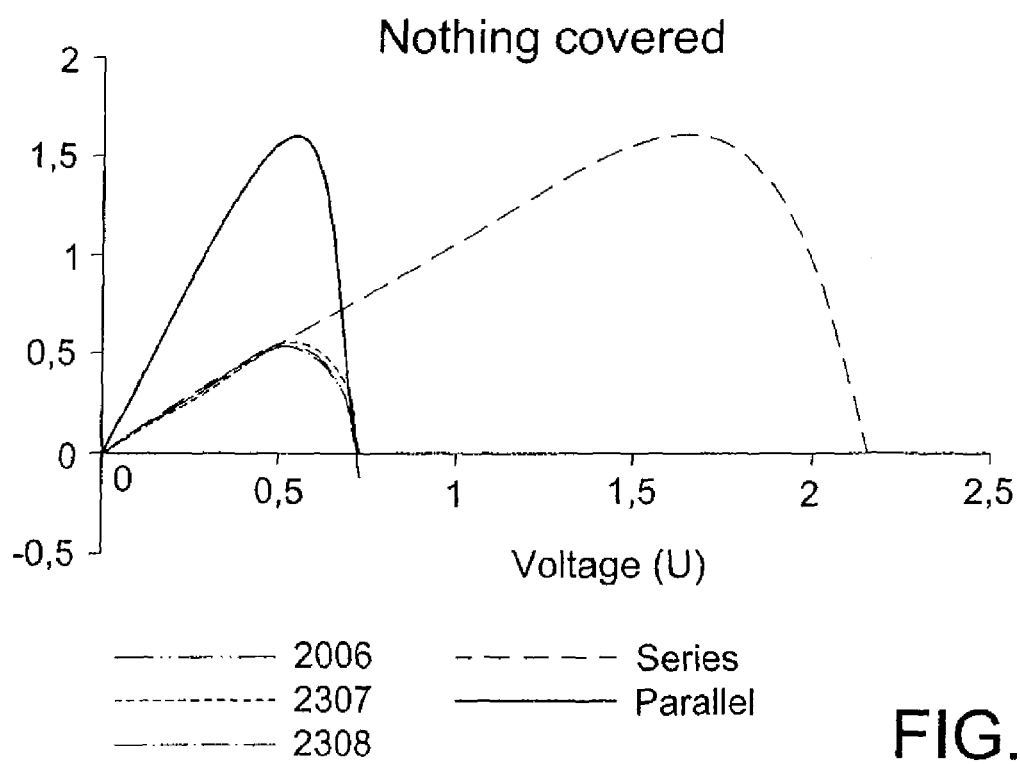
FIG. 18 shows the power as a function of the voltage for the cells individually, in series and in parallel as in FIG. 17.

FIG. 18 shows the power as function of the voltage for the same cells and serial/parallel-connection as in FIG. 17. The maximum effect is identical for serial- and parallel-connected modules.

Figure 19:
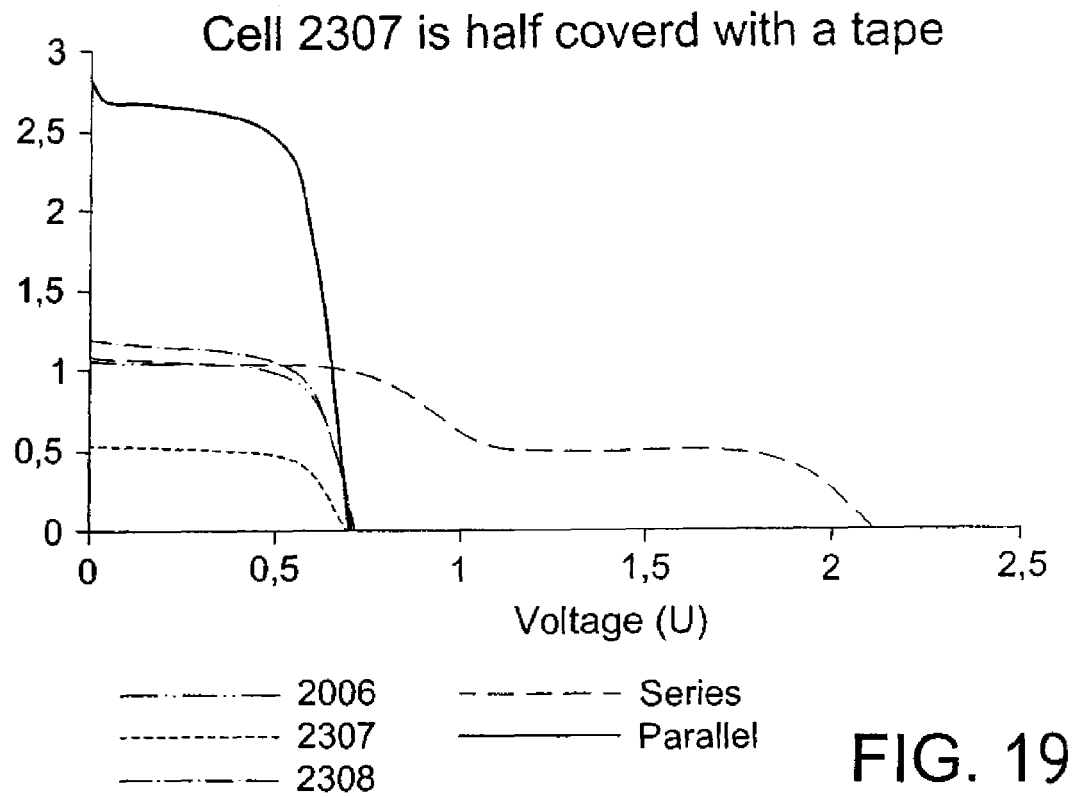
FIG. 19 shows the current-voltage-characteristics of the cells arranged as in FIG. 17 or 18, where one of the cells has been partly shaded

FIG. 19 shows the same curves as in FIG. 17 when one cell (2307) is partly put in the dark to perform less good than its neighbors (to e.g., simulate that a cell is partly shaded or for other reasons less good performing). Note that the open-circuit voltage of the "shaded" cell remains more or less the same as for the other ones.

Figure 20:
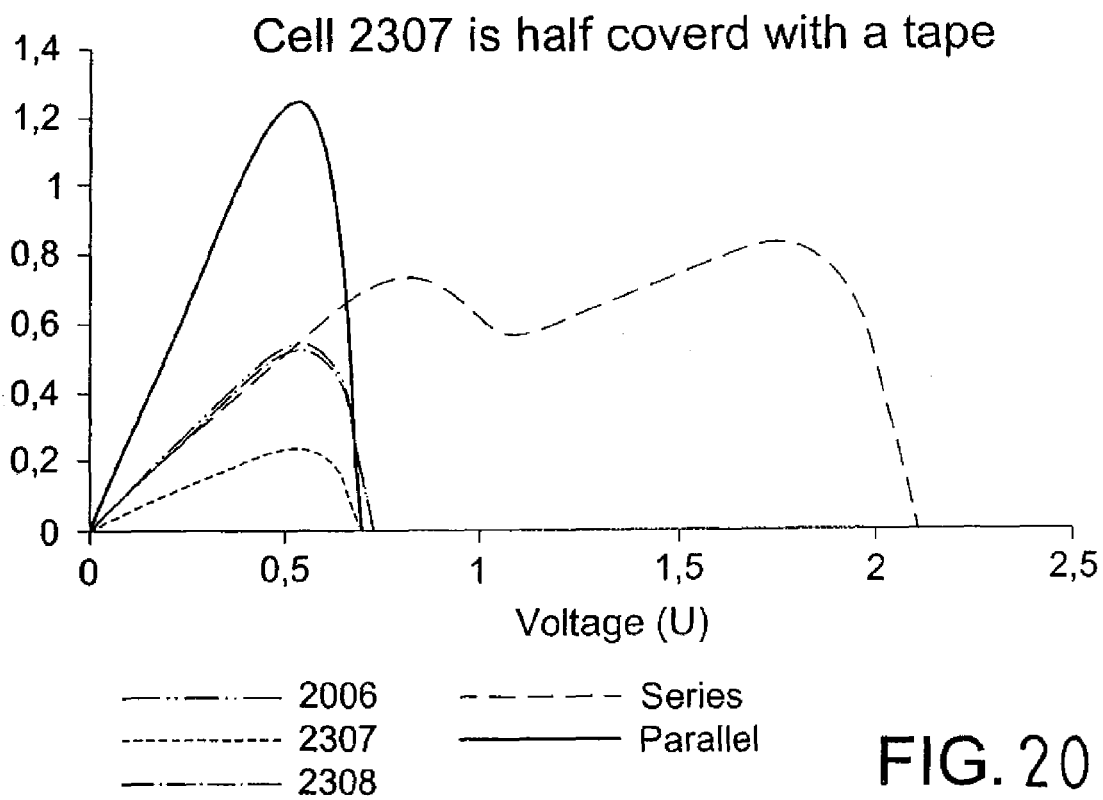
FIG. 20 shows the power as a function of the voltage for the cells individually, in series and in parallel as in FIG. 18 with a single cell partly shaded.

FIG. 20 shows the power as function of the voltage for the same cells and serial/parallel-connection as in FIG. 19. The maximum effect is much larger for the parallel-connected module due to the fact that the open-circuit voltage of the "shaded" cell remained more or less unchanged in relation to the others.

The monolithic electrodes have been screen-printed on laser-structured TCO glass plates (TEC 15 Ω/square from Hartford Glass). Before printing the electrodes, the glass plates were carefully washed. After printing the $TiO_2$ layer, the electrodes were sintered at 450° C. for one hour in order to remove the organic additives of the pastes and to fuse the particles. Subsequently, the remaining layers were printed in the following order: silver, spacer, Carbon 1 (adhesion layer), Carbon 2 (counter electrode). The layers were quickly dried at 125° C. after printing each layer. After the last printing step, the glass plates were placed in a titanium rack and sintered at 390° C.

Subsequently, the rack containing the electrodes was immersed into the dye solution: cis-di(thiocyanato)-bis(4,4'-dicarboxy-2,2'-bipyridine)Ru(II), in a concentration of 0.3 mM, dissolved in acetonitrile/tert-butanol (50/50 by volume). The electrodes were left in the dye solution, rinsed with acetonitrile, and dried under vacuum. The electrolyte solution has been manually applied on the electrodes. Subsequently, the modules were encapsulated in a vacuum/heat process using the thermoplastic material SURLYN® as sealant, according to a previously described procedure in WO 01/97237.

The invention claimed is:

1. A sealed monolithic photo-electrochemical system comprising:
   an electrically insulating substrate,
   an electrically conducting pattern including carrier areas arranged to support working electrodes, contact portions connected to counter electrodes, a first set of contact paths connecting said carrier areas with a first terminal, and a second set of contact paths connecting said contact portions with a second terminal,
   an array of porous structures arranged on said substrate, where each porous structure includes a working electrode, an insulating layer and a counter electrode, which are arranged in a monolithic configuration, and
   an electrolyte at least partially filled in said porous structures to form a plurality of electrochemical cells and an encapsulation covering said array of porous structures,
   wherein said plurality of electrochemical cells includes a row of elongated cells separated by gaps, and
   wherein said first and second sets of contact paths include:
      a first base which extends along said row of elongated cells and a first set of extensions connected to said first base and includes a first extension extending alongside the first cell in said row of elongated cells, a last extension extending alongside the last cell in said row of elongated cells and a first set of intermediate extensions extending into every other gap between the cells starting with the second gap such that said first base and first set of extensions form comb shaped patterns, and
      a second base which extends along said row of elongated cells, and a second set of intermediate extensions connected to said second base and extending into every other gap between the cells starting with the first gap such that said second base and second set of extensions form comb shaped patterns,
      wherein each intermediate extension is connected to both adjacent cells, and where the first base and the first set of extensions form part of one of the first or second set of contact paths and the second base and the second set of extensions form part of the other set of contact paths, and
      wherein said first and second sets of contact paths connect said plurality of electrochemical cells in parallel.

2. The sealed monolithic photo-electrochemical system according to claim 1, wherein said carrier areas and contact portions are formed of an intermediate layer of an electrically conducting material located on said substrate.

3. The sealed monolithic photo-electrochemical system according to claim 2, wherein said intermediate layer is formed of a first material adapted to be exposed to said electrolyte and wherein said first and second sets of contact paths include conductors of highly conducting material having a lower resistivity than said first material.

4. The sealed monolithic photo-electrochemical system according to claim 3, wherein said first material is doped $SnO_2$ and wherein said highly conducting material is silver.

5. The sealed monolithic photo-electrochemical system according to claim 1, wherein said row of cells includes an even number of cells.

6. The sealed monolithic photo-electrochemical system according to claim 1, wherein said row of cells are rectangular and include a width of about 5-10 mm and a length of about 30-200 mm.

7. The sealed monolithic electrochemical system according to claim 1, wherein said counter electrode includes a first end portion which extends down to and is in contact with said contact portion of said second set of contact paths such that the counter electrode is in electrical contact with the second set of contact paths, and wherein said first end portion includes a contact layer having a different composition than the remaining part of the counter electrode, which contact layer is in electrical contact with said second set of contact paths.

8. The sealed monolithic electrochemical system according to claim 7, wherein said contact layer having the different composition adheres more strongly to the contact portions than the remaining part of the counter electrode.

9. The sealed monolithic electrochemical system according to claim 8, wherein said contact layer having the different composition is made of different proportions of graphite and carbon black than the remaining part of the counter electrode.

10. The sealed monolithic photo-electrochemical system according to claim 1, wherein said cells include a width of about 5-10 mm and a length of about 30-200 mm.

11. The sealed monolithic photo-electrochemical system according to claim 1, wherein said first and second bases are positioned on opposite sides of the row of elongated cells.

12. A sealed monolithic photo-electrochemical system, comprising:
   an electrically insulating substrate;
   an electrically conducting pattern including carrier areas arranged to support working electrodes, contact portions connected to counter electrodes, a first set of contact paths connecting said carrier areas with a first terminal, and a second set of contact paths connecting said contact portions with a second terminal; and
   an array of porous structures arranged on said substrate, where each porous structure includes a working electrode, an insulating layer and a counter electrode, which are arranged in a monolithic configuration, an electrolyte at least partially filled in said porous structures to form a plurality of electrochemical cells and an encapsulation covering said array of porous structures,
   wherein said plurality of electrochemical cells includes a row of cells separated by gaps, which gaps extend between two working electrodes of two adjacent cells, and wherein the counter electrodes of two adjacent cells are connected into one continuous counter electrode such that each cell share counter electrode with only one adjacent cell in that row, and
   wherein said first and second sets of contact paths include:
      a first base which extends along said row of cells and a first set of extensions connected to said first base and includes a first extension extending alongside the first cell in said row of cells, a last extension extending alongside the last cell in said row of cells and a first set of intermediate extensions extending into every other gap between the cells starting with the second gap such that said first base and first set of extensions form comb shaped patterns, wherein each intermediate extension is connected to both adjacent cells; and
      a second base which extends along said row of cells, and a second set of intermediate extensions each connected to said second base and each connected to one of said continuous counter electrodes shared between two adjacent cells starting with continuous counter electrode of the first pair of adjacent cells such that said second base and second set of extensions form comb shaped patterns, wherein the first base and the first set of extensions form part of one of the first or second set of contact paths and the second base and the second set of extensions forms part of the other set of contact paths, and wherein said first and second sets of contact paths connect said plurality of electrochemical cells in parallel.

13. The sealed monolithic photo-electrochemical system according to claim 12, wherein said second intermediate extension extends along said adjacent cells.

14. The sealed monolithic photo-electrochemical system according to claim 12, wherein said second set of intermediate extensions is carried by at least one continuous counter electrode, such that the continuous counter electrode is arranged between said intermediate extension and said substrate.

15. The sealed monolithic photo-electrochemical system according to claim 12, wherein said second set intermediate extensions is carried by at least one continuous counter electrode, such that the continuous counter electrode is arranged between said intermediate extension and said insulating layer.

16. The sealed monolithic photo-electrochemical system according to claim 12, wherein said first and second bases are positioned on opposite sides of the row of cells.

17. A sealed monolithic photo-electrochemical system, comprising:
an electrically insulating substrate,
an electrically conducting pattern including carrier areas arranged to support working electrodes, contact portions connected to counter electrodes, a first set of contact paths connecting said carrier areas with a first terminal, and a second set of contact paths connecting said contact portions with a second terminal,
an array of porous structures arranged on said substrate, where each porous structure includes a working electrode, an insulating layer and a counter electrode, which are arranged in a monolithic configuration, and an electrolyte at least partially filled in said porous structures to form a plurality of electrochemical cells and an encapsulation covering said array of porous structures,
wherein said plurality of electrochemical cells includes a row of cells separated by gaps, which gaps extend between two counter electrodes of two adjacent cells, and wherein the working electrodes of two adjacent cells are connected into one continuous working electrode such that each cell share working electrode with only one adjacent cell in that row, and
wherein said first and second sets of contact paths include:
a first base which extends along said row of cells and a first set of extensions connected to said first base and includes a first extension extending alongside the first cell in said row of cells, a last extension extending alongside the last cell in said row of cells and a first set of intermediate extensions extending into every other gap between the cells starting with the second gap such that said first base and first set of extensions form comb shaped patterns, wherein each intermediate extension is connected to both adjacent cells; and
a second base which extends along said row of cells, and a second set of intermediate extensions each connected to said second base and each connected to one of said continuous working electrodes shared between two adjacent cells starting with continuous working electrode of the first pair of adjacent cells such that said second base and second set of extensions form comb shaped patterns,
wherein the first base and the first set of extensions form part of one of the first or second set of contact paths and the second base and the second set of extensions forms part of the other set of contact paths, and
wherein said first and second sets of contact paths connect said plurality of electrochemical cells in parallel.

18. The sealed monolithic photo-electrochemical system according to claim 17, wherein said first and second bases are positioned on opposite sides of the row of cells.

19. A sealed monolithic photo-electrochemical system, comprising:
an electrically insulating substrate,
an electrically conducting pattern including carrier areas arranged to support working electrodes, contact portions connected to counter electrodes, a first set of contact paths connecting said carrier areas with a first terminal, and a second set of contact paths connecting said contact portions with a second terminal, and
an array of porous structures arranged on said substrate, where each porous structure includes a working electrode, an insulating layer and a counter electrode, which are arranged in a monolithic configuration, an electrolyte at least partially filled in said porous structures to form a plurality of electrochemical cells and an encapsulation covering said array of porous structures,
wherein said plurality of electrochemical cells includes a row of cells, the counter electrodes of at least two adjacent cells are connected into one continuous counter electrode, and the working electrodes of at least two adjacent cells are connected into one continuous working electrode, and
wherein said first and second sets of contact paths include:
a first base which extends along said row of cells and a first set of extensions connected to said first base and including a first set of extensions connected to the counter electrodes of said row of cells such that said first base and first set of extensions form comb shaped patterns, and
a second base which extends along said row of cells, and a second set of extensions connected to said second base and connected to the working electrodes of said row of cells such that said second base and second set of extensions form comb shaped patterns,
wherein the first base and the first set of extensions form part of one of the first or second set of contact paths and the second base and the second set of extensions forms part of the other set of contact paths, and
wherein said first and second sets of contact paths connect said plurality of electrochemical cells in parallel.

20. The sealed monolithic photo-electrochemical system according to claim 19, wherein said first and second extensions extend along said adjacent cells.

21. The sealed monolithic photo-electrochemical system according to claim 19, wherein said first set of intermediate extensions is carried by a counter electrode, such that said counter electrode is arranged between said intermediate extension and said substrate.

22. The sealed monolithic photo-electrochemical system according to claim 19, wherein said first set of intermediate extensions is carried by a counter electrode, such that said counter electrode is arranged between said intermediate extension and said insulating layer.

23. The sealed monolithic photo-electrochemical system according to claim 19, wherein said second set of intermediate extensions is carried by a working electrode, such that said working electrode is arranged between said intermediate extension and said substrate.

24. The sealed monolithic photo-electrochemical system according to claim 19, wherein the insulating layer of at least two adjacent cells are connected into one continuous insulating layer.

25. The sealed monolithic photo-electrochemical system according to claim 19, wherein a plurality of adjacent cells in said row of cells all share one continuous counter electrode, all share one continuous insulating layer and all share one continuous working electrode.

26. The sealed monolithic photo-electrochemical system according to claim 19, wherein said first and second bases are positioned on opposite sides of the row of cells.

* * * * *